United States Patent
Rose et al.

(10) Patent No.: US 11,294,798 B2
(45) Date of Patent: Apr. 5, 2022

(54) METHOD AND SYSTEM FOR CONTEXT BASED TESTING OF SOFTWARE APPLICATION VULNERABILITIES

(71) Applicant: Lenovo (Singapore) Pte. Ltd., New Tech Park (SG)

(72) Inventors: Amy Leigh Rose, Chapel Hill, NC (US); Joshua Menhaz Rahman, Garner, NC (US)

(73) Assignee: LENOVO (SINGAPORE) PTE. LTD., New Tech Park (SG)

(*) Notice: Subject to any disclaimer, the term of this patent is extended or adjusted under 35 U.S.C. 154(b) by 754 days.

(21) Appl. No.: 15/813,254

(22) Filed: Nov. 15, 2017

(65) Prior Publication Data

US 2019/0146900 A1 May 16, 2019

(51) Int. Cl.
*G06F 9/44* (2018.01)
*G06F 11/36* (2006.01)
*G06F 21/57* (2013.01)
*G06F 8/41* (2018.01)

(52) U.S. Cl.
CPC ...... *G06F 11/3668* (2013.01); *G06F 11/3684* (2013.01); *G06F 11/3692* (2013.01); *G06F 21/577* (2013.01); *G06F 8/427* (2013.01)

(58) Field of Classification Search
None
See application file for complete search history.

(56) References Cited

U.S. PATENT DOCUMENTS

| | | | |
|---|---|---|---|
| 9,195,809 B1* | 11/2015 | Kaplan | G06F 21/577 |
| 9,830,203 B2* | 11/2017 | Schnellinger | H04W 4/60 |
| 2008/0155661 A1* | 6/2008 | Arashin | H04L 63/08 726/4 |
| 2011/0029961 A1* | 2/2011 | Muth | G06F 21/52 717/154 |
| 2011/0145926 A1* | 6/2011 | Dalcher | G06F 11/3466 726/26 |
| 2014/0237606 A1* | 8/2014 | Futoransky | G06F 21/577 726/25 |
| 2014/0359371 A1* | 12/2014 | Schur | G06F 11/3684 714/38.1 |
| 2016/0314302 A1* | 10/2016 | Sabetta | G06F 21/577 |

* cited by examiner

*Primary Examiner* — Anna C Deng
(74) *Attorney, Agent, or Firm* — The Small Patent Law Group LLC; Dean D. Small

(57) ABSTRACT

Methods, systems and program products are provided for controlling one or more processors configured with executable instructions to launch a subject application and implement functionality of user interactive (UI) resources defined by the subject application. The methods, systems and program products identify a UI element provided on a first UI resource from the UI resources and a context indicator associated with the UI element. The methods, systems and program products generate one or more examination challenges for the UI element based on the context indicator, tests for vulnerabilities related to the UI element by applying the examination challenges to the UI elements.

24 Claims, 6 Drawing Sheets

METHOD AND SYSTEM FOR CONTEXT BASED TESTING OF SOFTWARE APPLICATION VULNERABILITIES

BACKGROUND

Embodiments of the present disclosure generally relate to methods and devices for dismissing notifications presented on a device.

Today, software security analysis (SSA) tools are offered that scan software applications to identify certain types of problems. For example, conventional SSA tools may perform a virus scan based on a signature. Also, SSA tools may require access to source code in order to perform the analysis.

The SSA tools perform the corresponding analysis from a particular "point in time" or PIT. As a PIT analysis, the SSA tool analyzes the software application based on a current state of the software application. For example, a "fuzz test" tool sends random data to input fields of an application in an effort to identify vulnerabilities in the application. As another example, pen-testing frameworks, such as the Mobile Security Framework MobSF application, is an open source mobile application that performs pen-testing and web API testing.

However, conventional SSA tools exhibit certain limitations. For example, convention fuzz test tools require a certain amount of manual configuration and do not alter the random data that is input to the application based on peripheral characteristics of an environment defined by the application. Also, pen-testing frameworks are static scanners that do not analyze objects that a user changes while interacting with an application.

Further, conventional SSA tools are not context aware in that such SSA tools do not consider what operations a subject application is capable of performing and do not consider transient security issues that may arise temporarily based on a dynamic condition of a software application that occurs through user behavior. For example, a security issue may arise due to buffer overflow, such as when too much data is sent to a text field. The buffer overflow may not always create a problem. However, when the application enters certain operational environments, then buffer overflow may cause the software application to break down. As another example, transient security issues may arise at run-time when a software application sends/receives malicious data and/or establishes a connection with a malicious network UI resource (e.g., an Internet site).

SUMMARY

In accordance with embodiments herein, a method, is provided, in which, under control of one or more processors configured with executable instructions launches a subject application and implements functionality of user interactive (UI) resources defined by the subject application. The method identifies a UI element provided on a first UI resource from the UI resources and a context indicator associated with the UI element. The method generates one or more examination challenges for the UI element based on the context indicator, tests for vulnerabilities related to the UI element by applying the examination challenges to the UI elements and records results of applying the examination challenges.

Additionally or alternatively, the UI resource represents a view, and the identifying the context indicator comprises identifying descriptive information presented on the view in connection with the UI element. The descriptive information comprises one or more of i) describing a purpose of the UI element or ii) providing instructions regarding how to use the UI element.

Additionally or alternatively, the testing may be comprised of determining whether the subject application freezes or terminates, in response to the examination challenge, and based thereon, re-launches the subject application. The subject application may further be returned to the UI resource and context present when the subject application froze or terminated.

Additionally or alternatively, the method may further comprise determining whether the subject application has performed an unauthorized action in response to the examination challenge. The determining may further comprise determining whether the unauthorized action corresponds to an unauthorized transition from the UI resource to a different unauthorized UI resource and in response thereto, returning to the UI resource.

Additionally or alternatively, the determining comprises determining whether the unauthorized action corresponds to an action that exceeds privileges associated with a user and in response thereto, returning the UI resource to a UI resource state at which the privileges are not exceeded. The UI element may be identified by parsing a software structure of the subject application. The generating the one or more examination challenges may comprise monitoring communication between the subject application and an external source, and identifying a response object transmitted from the external source, modifying the response object.

In accordance with embodiments herein, a system is provided, comprised of a processor and memory to store program instructions accessible by the processor. Responsive to execution of the program instructions, the processor launches a subject application and automatically implements functionality of user interactive (UI) resources defined by the subject application. The processor then identifies a UI element provided on a first UI resource from the UI resources and identifies a context indicator associated with the UI element. The processor generates one or more examination challenges for the UI element based on the context indicator and tests for vulnerabilities related to the UI element by applying the examination challenges to the UI elements.

Optionally, the processor conveys results of applying the examination challenges to one or more of the memory or a display records results of applying the examination challenges. Additionally or alternatively, the first UI resource includes first and second UI elements and the processor, responsive to execution of the program instructions, may automatically enter data in the first UI element and selects the second UI element to automatically implement the functionality to advance the first UI resource to a select resource state. The UI resource may represent a view, and wherein the processor, responsive to execution of the program instructions, identifies the context indicator by identifying descriptive information presented on the view in connection with the UI element. The descriptive information may describe a purpose of the UI element and/or provide instructions regarding how to use the UI element.

Additionally or alternatively, the subject application may be comprised of an XML structure, wherein the processor, responsive to execution of the program instructions, may identify the context indicator based on information in the XML structure. The processor may further, responsive to execution of the program instructions, determine whether the subject application has performed an unauthorized action in response to the examination challenge. Further, the processor, responsive to execution of the program instructions, may determine whether the unauthorized action corresponds to an unauthorized transition from the UI resource to a different unauthorized UI resource and in response thereto, return to the UI resource. The process may, responsive to execution of the program instructions, determine whether the unauthorized action corresponds to an action that exceeds privileges associated with a user and in response thereto, return the UI resource to a UI resource state at which the privileges are not exceeded.

In accordance with embodiments herein, a computer program product is provided comprising a non-signal computer readable storage medium comprising computer executable code for launching a subject application and automatically implements functionality of user interactive (UI) resources defined by the subject application. The computer program product identifies a UI element provided on a first UI resource, and then identifies a context indicator associated with the UI element. The computer program product generates one or more examination challenges for the UI element based on the context indicator and tests for vulnerabilities related to the UI element by applying the examination challenges to the UI elements. The computer program product records results of applying the examination challenges.

Additionally or alternatively, the computer program product may comprise to define the first UI resource to include first and second UI elements and to automatically enter data in the first UI element and selects the second UI element to automatically implement the functionality to advance the first UI resource to a select resource state.

Additionally or alternatively, the computer program product may further comprise code to determine whether the subject application has performed an unauthorized action in response to the examination challenge, and determine whether the unauthorized action corresponds to an unauthorized transition from the UI resource to a different unauthorized UI resource and in response thereto, returning to the UI resource. The code may further determine whether the subject application has performed an unauthorized action in response to the examination challenge. The code may further determine whether the unauthorized action corresponds to an action that exceeds privileges associated with a user and in response thereto, return the UI resource to a UI resource state at which the privileges are not exceeded.

DETAILED DESCRIPTION

Figure 1:
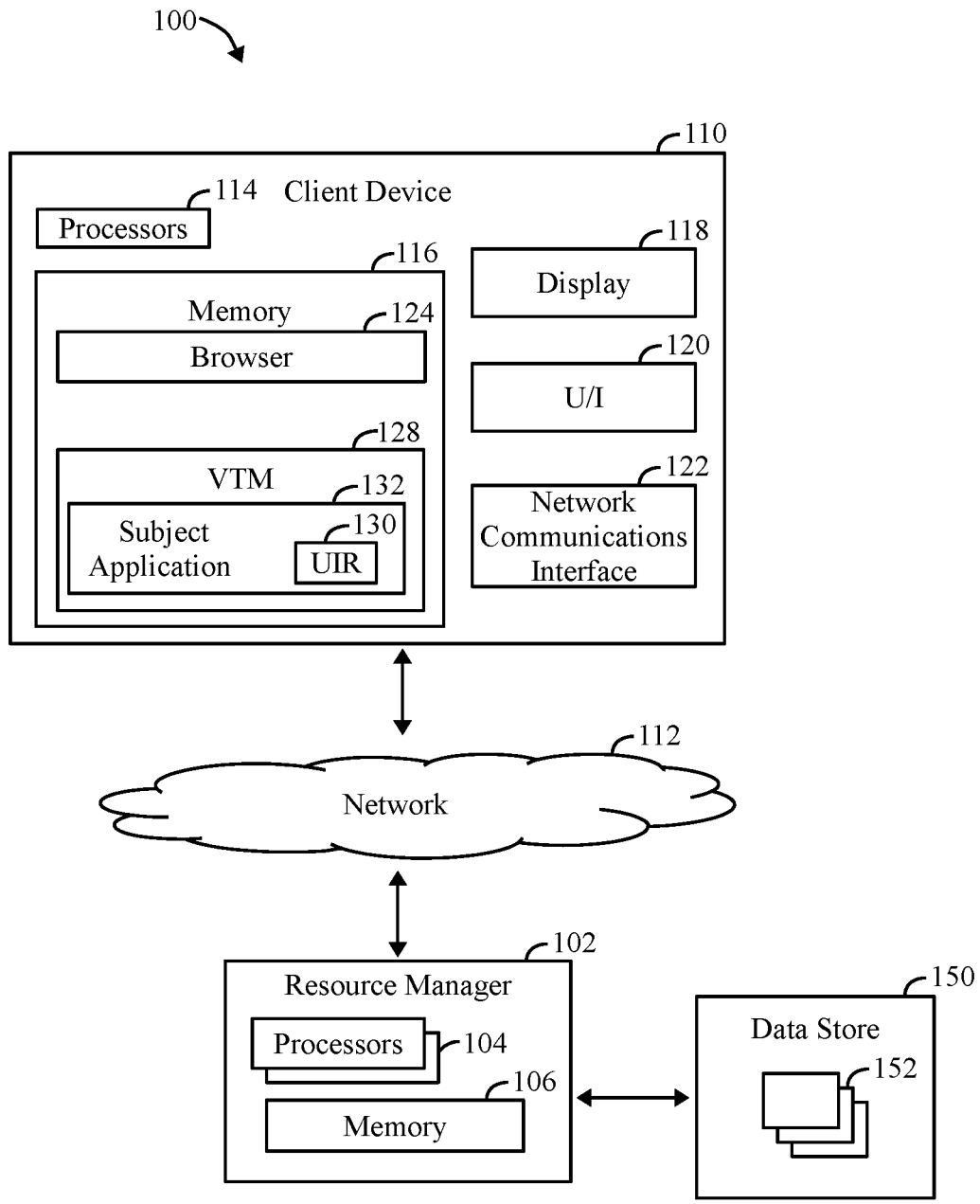
FIG. 1 illustrates a system for context-based testing of software application vulnerabilities in accordance with embodiments herein.

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

The terms "user interactive resource" or "UI resource" refer to a resource defined by a software application, such as a page, view or file, where the resource enables a user to interact with the software application. The UI resources are presented at a user interface during operation of the software application. By way of example, a UI resource may correspond to a web page or view presented by the application. The web page or view may include user input fields, data output and the like. A non-limiting example of a UI resource includes a webpage that includes one or more data entry fields, by which a user may enter information in connection with implementing the software application. As other non-limiting examples, the same or different UI resources may include one or more buttons, icons or other touch points, that are selectable by a user to advance through the operation of software application.

The terms "user interface element" or "UI element" refer to objects, icons, elements, functionality, and otherwise items that are presented on a UI resource to enable user interaction, selection, navigation, touch functionality and the like in connection with implementing the software application. Non-limiting examples of interactive objects include buttons, icons, slide bars, and data entry fields. Non-limiting examples of touch functionality include single and multi-touch actions, gestures (e.g. swipe, spreading fingers to expand, shrinking fingers to contract), and other actions, for which the application responds. It is recognized that touch functionality may be implemented through a touch sensitive display, virtual reality user interface, as well as through a mouse and keyboard. Non-limiting examples of a nature or type of the UI element include a navigation element, user entry element, application functionality command (AFC) element, linking element and the like. Navigation elements represent elements that facilitate navigation within a UI resource (page), navigation between UI resources within the application, and navigation to UI resources outside of the application. For example, a navigation element may represent a button, link, a horizontal scrollbar, vertical scrollbar, and the like. A navigation element may also represent a button to advance to a next or prior page in the application, and/or a button or field that allows the user to go to a third party web page, web link or other UI resource beyond the application. A user entry element represents an element by which a user enters data and other information, such as user ID, password, names, addresses, alphanumeric text, monetary amounts, audio, video, graphics, pictures, and the like. AFC elements represent elements that allow a user to direct the application to perform actions. For example, AFC elements may include the "login" icon on a login page, a "send" icon on an email page, a "withdraw" icon on a bank account management page, and the like. Linking elements represent UI elements that direct the application to a third party web page or other UI resource outside of the application. For example, in an email application, a UI element to "attach" a file may launch a third party file management application, such that the "attach" element may represent a linking element. As another example, in a banking application, a "map" or "address" element may allow a user to launch a third party mapping application to identify an address of a third party to be paid.

The term "data entry field" refers to any field configured to receive an input from a user, such as text, alphanumeric content, checking boxes, and the like.

The term "context-aware" refers to sensing a physical environment that is created by an application and capabilities of the application, and adapting behavior according to the environment and application capabilities.

The term "UI resource state" refers to a present state or condition of an individual UI resource at a particular point in the operation of a subject application. For example, in connection with a banking application, a UI resource may correspond to a bill payment page/view, while the UI resource state may correspond to a state in which a bank account has a select amount of funds available. Optionally, the UI resource state may also include certain information entered into data entry UI elements, such as a name, address and monetary amount to be paid when the bill payment page is completed and processed. It is recognized that, one or more operations and/or data may need to be entered in other UI resources in order to reach a particular UI resource state (e.g entering various types of data and selecting various options within the functionality of a subject application in order to reach a particular UI resource and cause the UI resource to have a particular UI resource state.

The terms "cross-site scripting exploits" or "CSS exploits" refer to exploits that enable an attacker to inject a client-side script into a web page. The client-side script may be injected into a web page sent by a server to the client without the knowledge or consent of the server's operators. When processed in the client's browser, the script may access private information stored in one or more cookies (or other storage elements) in the memory of the browser. The script may forward the stolen information to a third-party recipient for potential use in fraudulent or otherwise malicious schemes. CCS exploits are often placed into two categories: non-persistent and persistent. In a non-persistent or reflected exploit, data provided to a server by a client (e.g., the client's browser) may be included in a web page sent back to the client without properly sanitizing the data. In a persistent or stored exploit, data introducing the exploit is stored by the web server and provided by the server to the client that requests a particular web page. The data may include a script that is executed on the client side when provided by the server to the client.

System Overview

FIG. 1 illustrates a system 100 for context-based testing of software application vulnerabilities, according to embodiments herein. The system 100 includes one or more client device 110. The client device 110 includes one or more processors 114, memory 116, a display 118, a user interface 120, a network communications interface 122, and various other mechanical components, electrical circuits, hardware and software to support operation of the client device 110. The memory 116 includes an operating system and instructions to implement the processes described herein. The memory 116 also stores one or more application programs to implement a vulnerability test module (VTM) 128 and a browser 124, as well as other software, information and data as described herein. The client device 110 is communicatively coupled to a network service that includes a resource manager 102 and a data store 150 through a network 112. The client device 110 may represent a network server, a handheld device (e.g., smart phone, tablet device, laptop computer, etc.) and the like. The vulnerability test module 114 may represent a software application operating on a portable handheld device and/or may represent a remote computing service, such as a cloud computing service.

In accordance with embodiments herein, the vulnerability test module (VTM) 114 launches a subject application 132. The subject application 132 defines various user interactive resources 130 that are implemented throughout operation of the subject application to provide desired functionality. The UI resources (e.g., webpages) may be generated in accordance with a markup language such as HTML (HyperText Markup Language), XML (eXtensible Markup Language) and the like. The vulnerability test module 128 automatically implements the functionality of user interactive (UI) resources as described herein, and in connection therewith identifies UI elements provided on the various UI resources. In addition, the vulnerability test module 128 identifies context indicators associated with the UI elements, and generates one or more examination challenges for the UI element based on the context indicators. The vulnerability test module 128 tests for vulnerabilities related to the corresponding UI elements by applying the examination challenges to the UI elements, and records results of applying the examination challenges. The vulnerability test module 128 may convey requests to external sources, such as at the network resource manager 102. The network resource manager 102 may return responsive objects in connection with the requests. As explained herein, the vulnerability test module 128 applies examination challenges to the UI resources in part through modifying responsive objects from external sources such as the network resource manager 102.

The network 112 may represent the World Wide Web, a local area network, a wide area network and the like. The client device 110 may represent various types of electronic devices including, but not limited to, smart phones, desktop or laptop computers, tablet devices, smart TVs and the like. The resource manager 102 may represent a single computer system or a collection of computer systems located at a common location or geographically distributed.

The resource manager 102 includes one or more processors 104 and memory 106, among other structures that support operation of the resource manager 102. The memory 106 includes an operating system, instructions to manage the data store 150. The data store 150 may store subject applications 152 organized in various manners and related to a wide variety of topics and content. As non-limiting examples, collections of subject applications 152 may be organized and maintained in connection with websites, webpages, blogs, social media and the like. The subject applications 152 may be organized and maintained within any manner of data sources, such as data bases, text files, data structures, libraries, relational files, flat files and the like. The client device 110 may load a subject application 132 from the data store 150 and perform the vulnerability testing described herein.

Vulnerability Test Process

Methods and systems are described that provide vulnerability testing for software applications. In accordance with embodiments herein, a security testing application is provided that simulates or mimics user behavior in a dynamic environment. The vulnerability testing application builds test cases by walking through functionality of the subject application. For example, the vulnerability testing application herein step through the subject application and dynamically interact with interactive objects and fields presented by resources that are defined by the subject application through the user interface. In accordance with embodiments herein, the vulnerability testing application is agnostic as to the functionality of the subject application (e.g., the vulnerability testing application does not care if the subject application is an email client or a Word document).

As one example, when the subject application represents a banking application, the vulnerability testing application identifies application to represent a banking application and the UI resource to enter user credentials (e.g., user ID and password). The vulnerability testing application identifies the user credential input fields and enters test user credentials. The vulnerability testing application is able to identify that functionality exists within the banking environment for making deposits and withdraws. The vulnerability testing application selects the appropriate buttons and touch points on the UI resources to conduct actions related to making deposits, withdrawals, paying bills and other functionality offered within the banking environment. For example, the testing application may attempt to transfer money utilizing invalid amounts (e.g., withdrawal more than the balance of an account, pay more than the amount due on a bill, deposit money in an improper currency). As another example, the testing application may enter malicious payload into a field in an attempt to direct the subject application to perform poorly (e.g., enter non-monetary amounts in a field intended only to receive monetary amounts, payer name/address, payee name/address and the like).

In accordance with embodiments herein, the vulnerability testing application may operate in a physical environment and/or a virtual environment. For example, the vulnerability testing application may create a virtual network, within which a subject application is implemented. Additionally or alternatively, the vulnerability testing application may determine that one or more physical device should be accessed by the subject application, in order to carry out a particular use scenario.

Figure 2A:
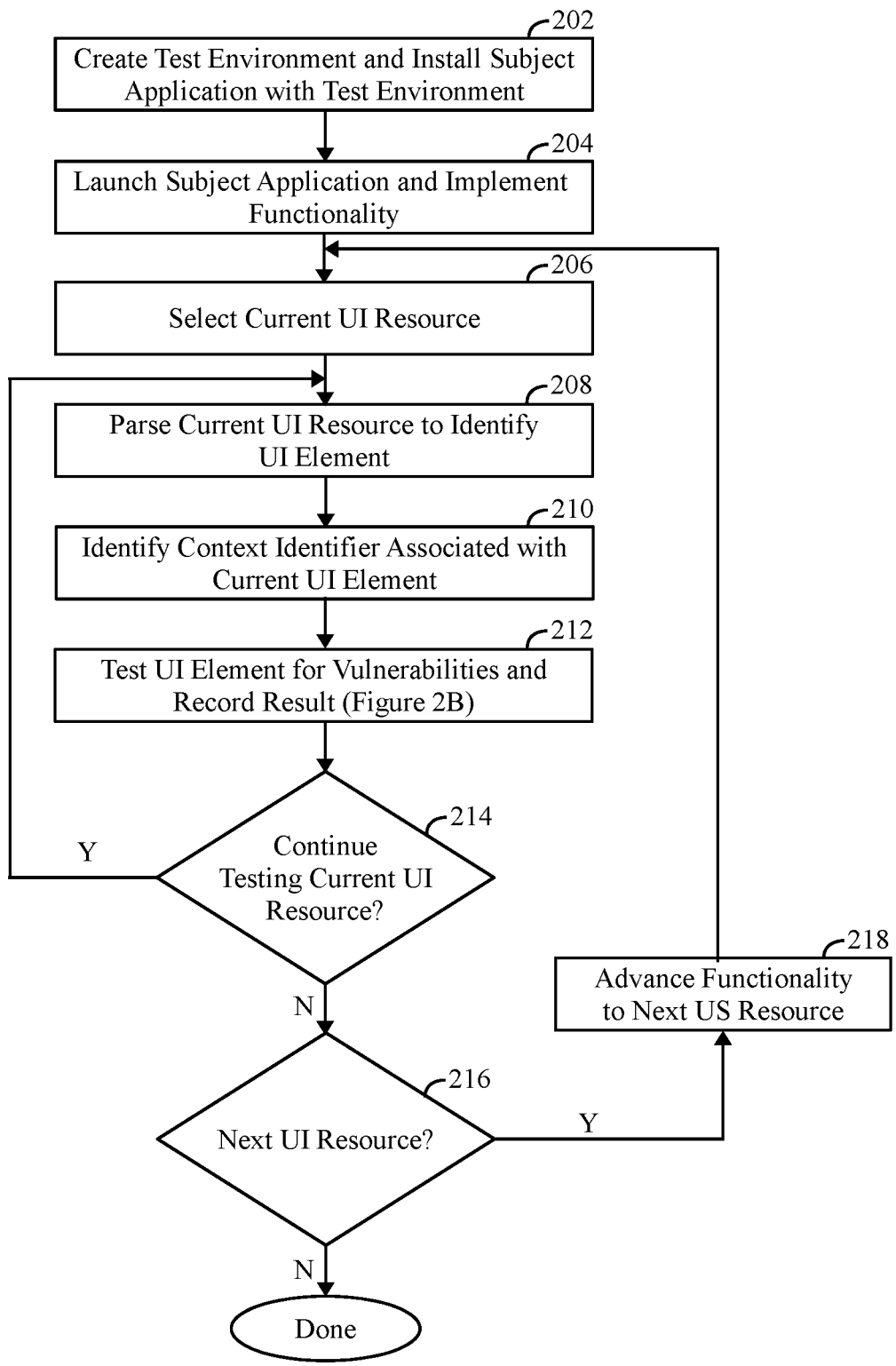
FIG. 2A illustrates a process of a UI element and an associated context in connection with a corresponding individual UI resource in accordance with embodiments herein.
Figure 2B:
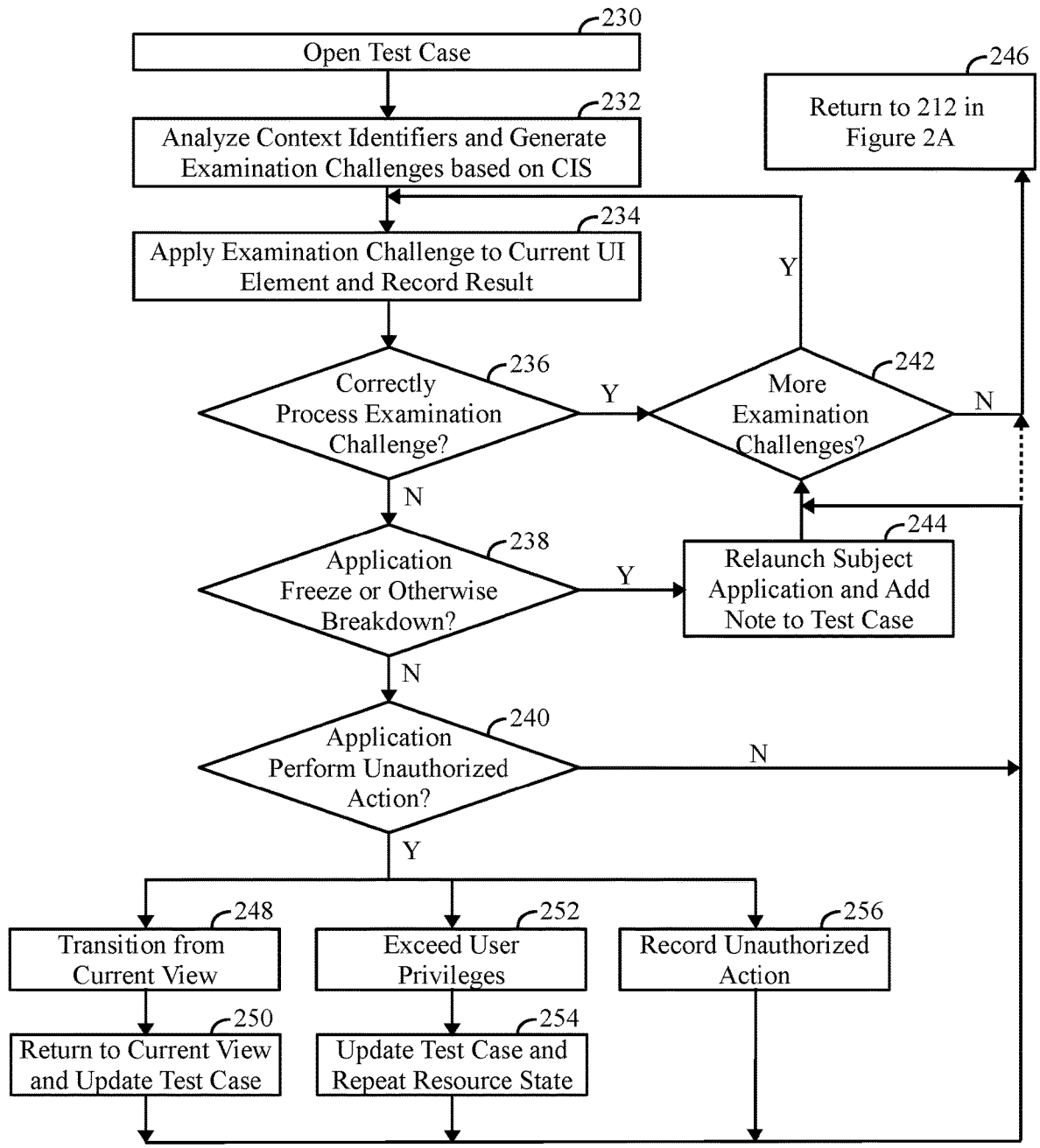
FIG. 2B illustrates a process that tests the UI element for vulnerabilities in accordance with embodiments herein.
Figure 2C:
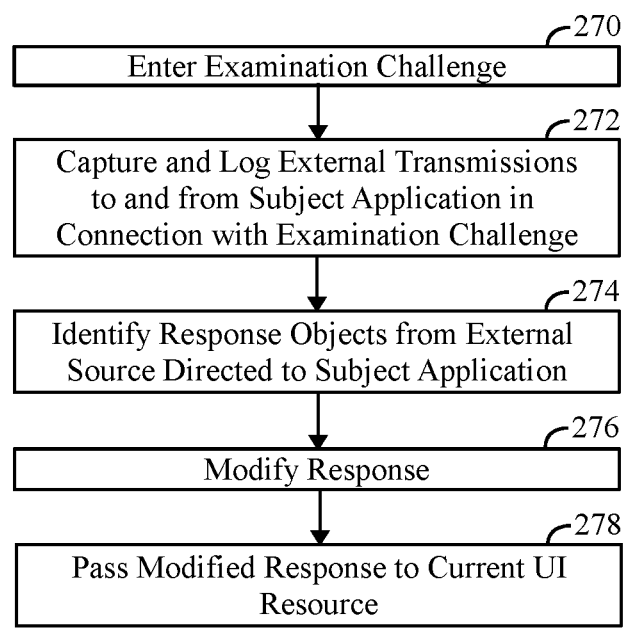
FIG. 2C illustrates a process for examining vulnerabilities in connection with external transmissions and sources in accordance with an embodiment herein.

FIGS. 2A-2C illustrate a process implemented in accordance with an embodiment herein for testing a subject application. The process of FIG. 2A identifies a UI element and an associated context in connection with a corresponding individual UI resource (e.g., view/page), while the process of FIG. 2B tests the UI element for vulnerabilities. As explained hereafter, the process performs a behavioral context awareness analysis by automatically implementing functionality of the UI resources defined by the subject application. As a further example, during the implementation, the subject application may present a UI resource that includes one or more data entry fields and one or more touch points for navigating from the present UI resource in connection with corresponding functionality. The functionality may be implemented by automatically and dynamically entering data into input fields, selecting/clicking on buttons, swiping screens, or otherwise performing user interactive actions to advance through one or more UI resources and the related operations provided by the subject application.

At 202, one or more processors create a test environment and install the subject application within the test environment. For example, the one or more processors may initially analyze the subject application in order to determine an environment in which the subject application operates. For example, the subject application may be designed to operate on an X86, ARM, MIPS and the like. The processors create a test environment that corresponds to the environment, for which the subject application is configured to operate. For example, in an X86 environment, the vulnerability testing application may create a virtual environment, whereas in an ARM environment, the processors may connect to a physical device. Thereafter, the subject application is self-installed into the test environment.

At 204, the one or more processors launch the subject application from the test environment and begin a behavioral context aware analysis. At 206, the one or more processors select a current UI resource. The behavioral context based analysis does not simply analyze a first UI resource, but also analyzes the context underlying UI elements within the page or view. As explained hereafter, the testing application builds one or more test cases based on interaction of the UI resource while implemented by the subject application. Optionally, at 206, the processors may record a resource state of the current UI resource. As explained herein, certain examination challenges may cause the subject application to perform unauthorized actions, transition to an unauthorized resource, freeze or otherwise break down. Accordingly, in accordance with embodiments herein, the subject application may be restarted and returned to a particular point in operation to return to a particular resource state at the current resource.

At 208, the one or more processors parse the current UI resource until identifying a UI element (e.g., first or next UI element) within the current UI resource. In accordance with one implementation, when an android user interface is used, the android UI is implemented through XML structures. For example, the subject application may be implemented through XML structures, or separate UI elements are defined by individual XML structures. The processors parse through the XML structures associated with the current UI resource until identifying a next UI element therein.

At 210, the one or more processors analyze the subject application to identify a context indicator associated with the current UI element in the current UI resource. For example, the processors may determine a nature or type of the UI element. Various examples of UI elements are provided above. The processors identify the context indicator based on various information from the subject application. For example, the processors may identify descriptive information presented on a page in connection with a UI element. The descriptive information may describe the purpose of the UI element and/or provide instructions to the user regarding how to user the UI element. Additionally or alternatively, the processors may identify the context indicator based on a data structure within the XML structure that designates the type of information to be entered in the UI element. For example, the UI element may be assigned an ASCII data structure, a data structure associated with U.S. currency, text only, graphics, audio and the like.

In the foregoing example, the context indicator is identified based on information in an XML structure that is directly related to the current UI element. Additionally or alternatively, the context indicator may be identified based on information in the XML, structure of the subject application that is not directly related to the current UI element. For example, the processors may analyze context related information for all or multiple UI elements and other portions of the UI resource in order to identify a context indicator for the current UI element. As another example, a header or other information in the XML structures of the application may designate an overall context of the UI resource (e.g., an Outlook based email application, an application to manage a bank account, a file management application). The processors may analyze all or multiple XML structures of a UI resource page or multiple UI resource pages to determine an overall context of a UI resource. For example, all or a substantial portion of the XML structures of a UI resource may be analyzed and the processors determine that the UI resource has a "TO field", "CC field", "BC field", "Send field" among others, and based thereon, determine that the UI resource concerns an email composition page.

Once the context indicator is determined, the context indicator is saved with the UI element and flow branches to 212. At 212, the one or more processors test the UI element for vulnerabilities and record the results. An example of a process for testing for vulnerabilities is described in connection with FIG. 2B, although it is understood that alternative and/or additional processes may be applied.

At 214, the one or more processors determine whether to continue testing the current UI resource. If so, flow returns to 208. The operations at 208-214 are repeated until any UI elements of interest on the current UI resource are tested for vulnerabilities. When all UI elements of interest on the current UI resource are tested, flow continues from 214 to 216. At 216, the one or more processors determine whether to advance to a next UI resource. If so, flow moves to 218. Otherwise, the process ends. At 218, the one or more processors advanced the functionality of the subject application to the next UI resource by automatically implementing one or more functional characteristics of the subject application. For example, at 218, the one or more processors may select a button or other interactive element on the current UI resource, thereby causing the subject application to automatically advance to the next UI resource. Additionally or alternatively, the one or more processors may enter valid data into one or more data input fields on the current UI resource and select a related button or other touch point to direct the subject application to advance to the next UI resource. Thereafter, flow moves from 218 back to 206. The operations at 206-218 are repeated for each subsequent UI resource, thereby automatically implementing the functionality of the various UI resources, identifying UI elements and related context and testing for vulnerabilities.

FIG. 2B illustrates a process for testing the UI element (at 212) identified in FIG. 2A in accordance with embodiments herein. At 230, the one or more processors open a test case for the current UI element. The test case is used to record various information concerning the UI element and related behavior of the subject application based on various examination challenges. At 232, the one or more processors analyze one or more context indicators associated with the UI element and based thereon generate one or more examination challenges. For example, a context indicator may indicate that a UI element is a navigation element (e.g., scroll icon, forward button, backward button). Accordingly, the processors generate navigation related examination challenges in order to test the navigation element. The context indicator may indicate that the UI element is an input field for monetary amounts, an input field for names/addresses, and the like. Accordingly, the examination challenge may represent different types of data that may be entered in the input field (e.g., ASCII strings, Hexadecimal strings, monetary amounts, etc.). As another example, the context indicator may indicate that the UI element is a field on an electronic mail (email) UI resource. Accordingly, the examination challenges may represent valid and invalid email addresses, blocked and unblocked domains, etc. A group of one or more examination challenges are generated.

At 234, the one or more processors apply an examination challenge to the UI element and records the results. For example, a UI element may have a navigation related context, such as when the UI element represents a button or scrollbar. In connection with the navigation related context, the examination challenge may simply constitute clicking on a button or moving the scrollbar in one or more directions. When a button is selected, the test case records whether the subject application navigates to the next appropriate page/view. When the UI element is a scrollbar, the test case records, as a challenge response, whether the view/page navigates in the correct direction. The test case also may record whether the view was adjusted by an appropriate amount based on the direction of movement and amount of movement in the scrollbar. As part of the test for navigation related UI elements, the processors may determine whether the data and other content on a page are visible as a web page is scrolled up, down, left or right. For example, it may be desirable to ensure that the full content of a web page are visible on certain types of browsers (e.g., on a smart phone, tablet device, laptop computer) as the scroll bars are manipulated. As another example, when a UI element is identified to have a credential related context (e.g., user ID, password, etc.), the examination challenge may constitute applying an ASCII or hexadecimal data stream to a username or password field. For example, candidate or valid usernames and passwords may be formatted as ASCII strings. The examination challenge may apply a non-ASCII string, such as a hexadecimal string, to the username or password UI element. At 234, the processors record in the test case the challenge result.

Optionally, a user may define examination challenges to be applied to particular UI elements. For example, a user may program a user ID and password to be applied to the user ID and password UI elements. A user may choose to program the user ID and password such as when the login page and login credentials are not the focus of vulnerability testing. By programming the valid user ID and password, the testing application advances beyond the login page quickly in order to begin testing of subsequent pages for vulnerabilities.

Optionally, the examination challenge may include testing vulnerabilities in connection with accessing external sources. FIG. 2C illustrates a process for examining vulnerabilities in connection with external transmissions and sources in accordance with an embodiment herein. At 270, the one or more processors enter an examination challenge. At 272, the one or more processors monitor communication between the subject application and external sources. The processors capture and log external transmissions between the subject application and external sources. For example, an examination challenge may correspond to selecting a UI element on a current UI resource which represents a link to an external source. In response to the selection of the external source, the subject application may convey a request to the external source for various information. At 272, the processors capture and log the transmission of the request, as well as monitor and log a return response from the external source.

At 274, the one or more processors identify one or more responsive objects transmitted from the external source to the subject application in response to the request. At 276, the one or more processors modify the responsive object in an active attempt to exploit vulnerabilities in the subject application. At 278, the one or more processors pass the modified responsive object to the current UI resource that is active. The modified responsive object represents one example of an examination challenge that may be applied to the current UI resource in connection with testing of a current UI element.

Additionally or alternatively, the process of FIG. 2C may test for vulnerabilities in connection with cross site stitching exploits.

At 236 to 240, the one or more processors analyze the results of the examination challenge. In particular, at 236, the one or more processors determine whether the subject application correctly processes the examination challenge. For example, the processors may determine whether the subject application safely and securely handle or otherwise act upon the examination challenge. For example, when a hexadecimal data string/payload is applied to an ACSII based data entry UI element, at 236, the processors determine whether the subject application correctly denied or disregarded the hexadecimal data payload. When an examination challenge is correctly handled at 236, flow advances to 242. Otherwise, flow continues to 238. At 242, the one or more processors determine whether additional examination challenges exist to be applied to the current UI element. When one or more additional examination challenges are available, flow advances from 242 back to 234. Alternatively, when no more examination challenges are to be applied to the current UI element, flow moves from 242 to 246. At 246, the flow returns to 208 in FIG. 2A where the next UI element is identified.

At 238, the one or more processors determine whether the subject application freezes or terminates operation, in response to the examination challenge. In some instances, applying a hexadecimal data string to an ASCII field may cause a subject application to freeze or otherwise stop operation. When the subject application freezes or otherwise breaks down, flow moves from 238 to 244. At 244, the one or more processors relaunch the subject application and add a note or other information to the test cased indicating the nature of the freeze or breakdown. In addition, the processors return the UI resource state of the subject application to the state or context in which the UI resource was operating when the examination challenge caused the subject application to freeze or breakdown. For example, in the banking application example, the processors may step through various webpages, enter various data inputs and select various buttons to return to a particular webpage and UI resource state (e.g., the page at which a bill is paid). Optionally, when additional operations are necessary in order to relaunch the application, such additional operations will also be recorded with test case. When the application is relaunched at 244, the one or more processors advance through the functionality of the subject application until returning to the current UI resource that was being examined at the time of the breakdown. Next, flow moves to 242, where the one or more processors determine whether additional examination challenges exist to be applied to the current UI element. Alternatively, when the application does not freeze or breakdown, flow moves from 238 to 240.

At 240, the one or more processors determine whether the application has performed an unauthorized action in response to the examination challenge. Various types of unauthorized actions may occur and thus it is understood that the examples provided in FIG. 2B are non-limiting and non-exhaustive. When an unauthorized action occurs, flow moves from 240 and branches along various paths depending on the nature of the unauthorized action. For example, an unauthorized action make correspond to the subject application moving from a current UI resource to a different UI resource, when such transition was not appropriate or correct based on the examination challenge. When the subject application performs an unauthorized transition from a current UI resource to a different unauthorized UI resource (248), the one or more processors return to the correct current UI resource and update the test case with information describing the unauthorized transition. Thereafter, flow returns to 242 where the processors determine whether additional examination challenges are to be applied to the current UI element.

By returning to the current UI resource at 250, the testing application enables additional examination challenges to be tested in connection with the current UI element and current UI resource or page. For example, the testing application may attempt to identify vulnerabilities in a check writing functionality of a banking application. To test the check writing functionality, an examination challenge may designate an incorrect party/address to receive a payment, designate a past date for the payment date, designate a payment amount in excess of available funds in a test account, direct an electronic money wire to a false account and the like. When operating correctly, the banking application should provide an error or denial message indicating an incorrect nature of the check writing or wire transfer data entries. However, when operating incorrectly, the banking application may accept the data entered and advance to the next page in connection with completing a banking function. In the event that the examination challenge causes the subject application to move to a wrong view/page, the operation at 250 returns to the prior bill payment view/page, in order to apply additional examination challenges.

Additionally or alternatively, an unauthorized action may correspond to an action that has exceeded the privileges (at 252) associated with the user. For example, an unauthorized action make correspond to permitting a user to withdraw an amount of money from a bank account (e.g., at an ATM teller or point-of-sale) in excess of the bank account balance, in excess of a maximum withdrawal amount or other limit defined by user privileges. As another example, in a file management application, an unauthorized action may correspond to permitting a user access to folders or directories on a secure network, permit a user to open secure documents without providing the necessary credentials and the like, where the user does not have the necessary privileges to access such folders, directories, or secure documents. As another example, an action exceeding user privileges may correspond to changing passwords, editing user account related information and the like without first establishing necessary credentials to authorize such changes/edits.

At 254, the one or more processors update the test case to describe the nature of the user privileges that have been exceeded and potential resulting consequences. Additionally or alternatively, at 254, the UI resource state of the subject application may be redefined or reset to a state at which the user privileges are not exceeded. As noted above, in connection with 206, a current state of a UI resource is recorded before a UI element is tested for vulnerabilities. As an example, when an examination challenge resulted in an excessive withdrawal from a bank account, the one or more processors, at 254, may return the UI resource state of the subject application to a state at which the user privileges are not exceeded by canceling the transfer and redepositing the funds to the original account. As another example, when user account information is modified without first verification of the appropriate credentials, the one or more processors, at 254, may return the UI resource state of the subject application to a state at which the user privileges are not exceeded by resetting the user account information to the initial values. Thereafter, flow returns to 242 where the processors determine whether additional examination challenges are to be applied to the current UI element.

By redefining user privileges and/or resetting data and other information utilized by a subject application, the testing application enables the subject application to be further tested for additional vulnerabilities. For example, when an examination challenge withdraws an excessive number of funds from an account, some or all further examination challenges may be prevented. For example, when no further funds remain in an account, the testing application would be unable to test vulnerabilities in other aspects of the financial application, such as in connection with verifying an electronic check writing functionality.

Additionally or alternatively, an unauthorized action may not result in a transition from a current UI resource, and may not exceed user privileges, but may still violate other rules within the subject application. Accordingly, at 256, the one or more processors record the unauthorized action. Thereafter, flow returns to 242 where the processors determine whether additional examination challenges are to be applied to the current UI element. Optionally, flow may advance from 250, 254 and 256 back to 246 (as indicated by the dashed arrow), without making a determination as to whether additional examination challenges exist (at 242).

The operations of FIG. 2B are iteratively repeated until a desired number of examination challenges are applied to the UI element. A test case is built in connection with the UI element indicating the types of examination challenges applied and the corresponding results. When an examination challenge results in a vulnerability, the examination challenge is recorded in the test case, along with a description of the vulnerability. Additionally or alternatively, when solutions or fixes are known for particular vulnerabilities, the test case may be updated to include a suggested fix/solution. Thereafter, the process of FIG. 2B returns at 246 to the process of FIG. 2A (at 212). The operations of FIGS. 2A and 2B are iteratively repeated until all desired UI elements are tested for a desired number of potential vulnerabilities. The operations of FIGS. 2A and 2B may be repeated in connection with all or a select number of the UI resources (e.g., views, pages, etc.) that are presented by a subject application. The operations of FIGS. 2A and 2B may step through each and every UI resource potentially presented by the subject application, where each UI resource is tested in connection with numerous different UI resource states.

Figure 3A:
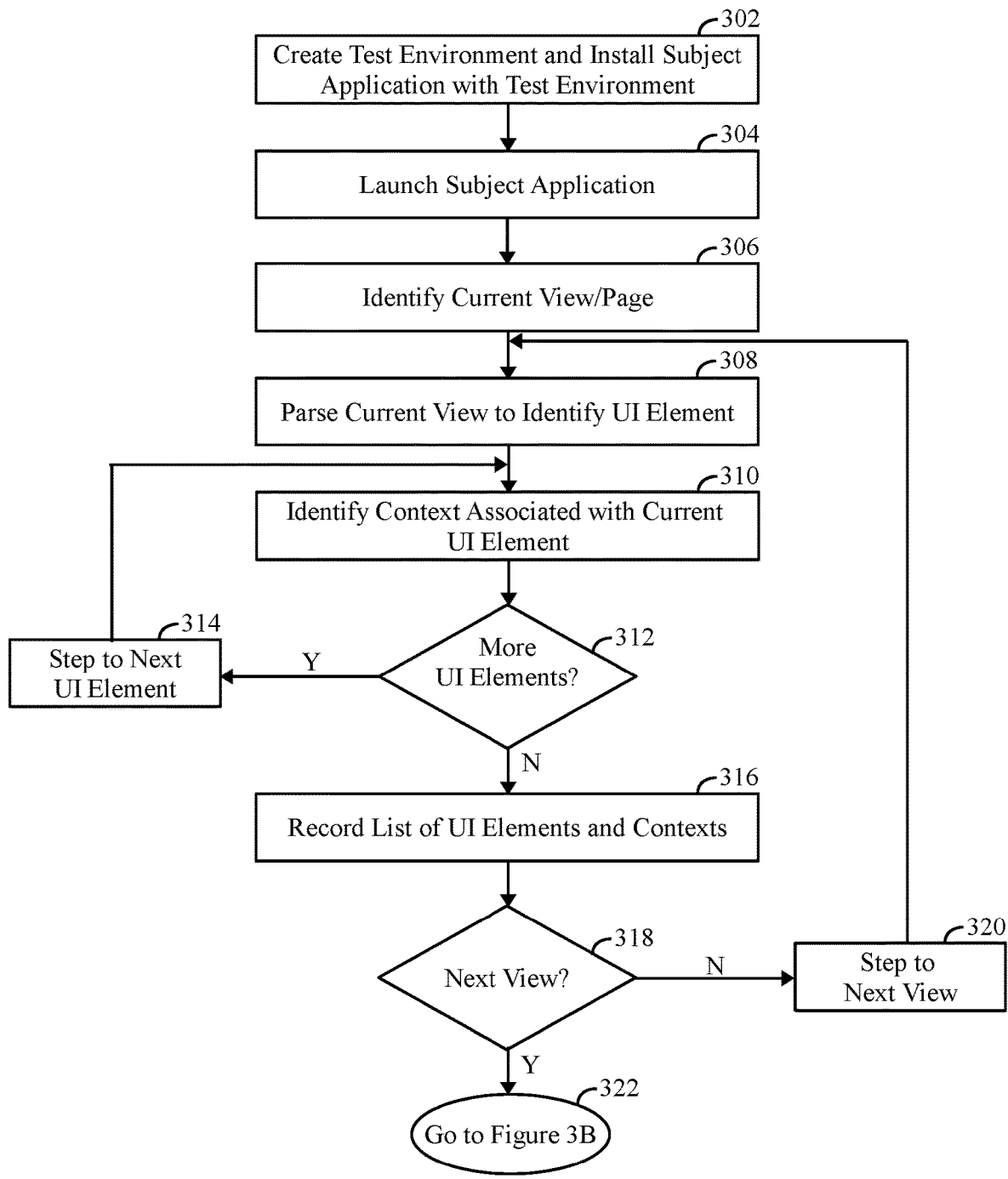
FIG. 3A illustrates a flowchart implemented in accordance with an embodiment herein for testing a subject application

FIG. 3A illustrates a flowchart implemented in accordance with an embodiment herein for testing a subject application. The process of FIGS. 3A and 3B differ from the process of FIGS. 2A and 2B, in that the process of FIG. 3A identifies all of the UI elements on one UI resource/page or all UI resources/pages within a subject application, before beginning to test for vulnerabilities. At 302, one or more processors create a test environment and install a subject application within the test environment. Thereafter, the subject application is self-installed into the test environment. At 304, the one or more processors launch the subject application from the test environment and begin a behavioral context based analysis. At 306, the one or more processors identify a current UI resource/page. At 308, the one or more processors parses the current UI resource until identifying all or at least a portion of UI elements within the current UI resource. At 310, the one or more processors analyze the subject application to identify a context associated with the current UI element in the current UI resource.

At 312, the one or more processors determine whether additional UI elements exist in the current UI resource. When additional UI elements are present in the current UI resource, flow moves to 314. Otherwise, flow continues to 316. At 314, the one or more processors step to the next UI element in the current UI resource. Thereafter, flow returns to 310 where the context is identified for the next UI element. The operations at 310-314 are repeated until all UI elements in the current UI resource are identified and assigned a corresponding context. Thereafter, flow moves to 316 where the list of UI elements and the associated contexts are recorded.

In accordance with the operations at 308 to 316, the testing application parses through the XML, structures for one or more views (e.g., per UI element) and attempts to determine the capability of a particular UI element (e.g., a button, checkbox, slider, user input field). Based on the capability of the UI element or elements, the testing application determines a context for the UI element/elements. At 318, the one or more processors determine whether another view exist in the subject application to be analyzed. When another view is present, flow moves to 320. Otherwise, flow continues to 322 where the UI elements are examined in accordance with embodiments herein. At 320, the one or more processors step to the next view within the subject application and flow returns to 308. After forming the list of UI elements and associated context for one or more pages of the subject application, the process moves to FIG. 3B where the UI elements are tested for vulnerabilities through examination challenges.

Figure 3B:
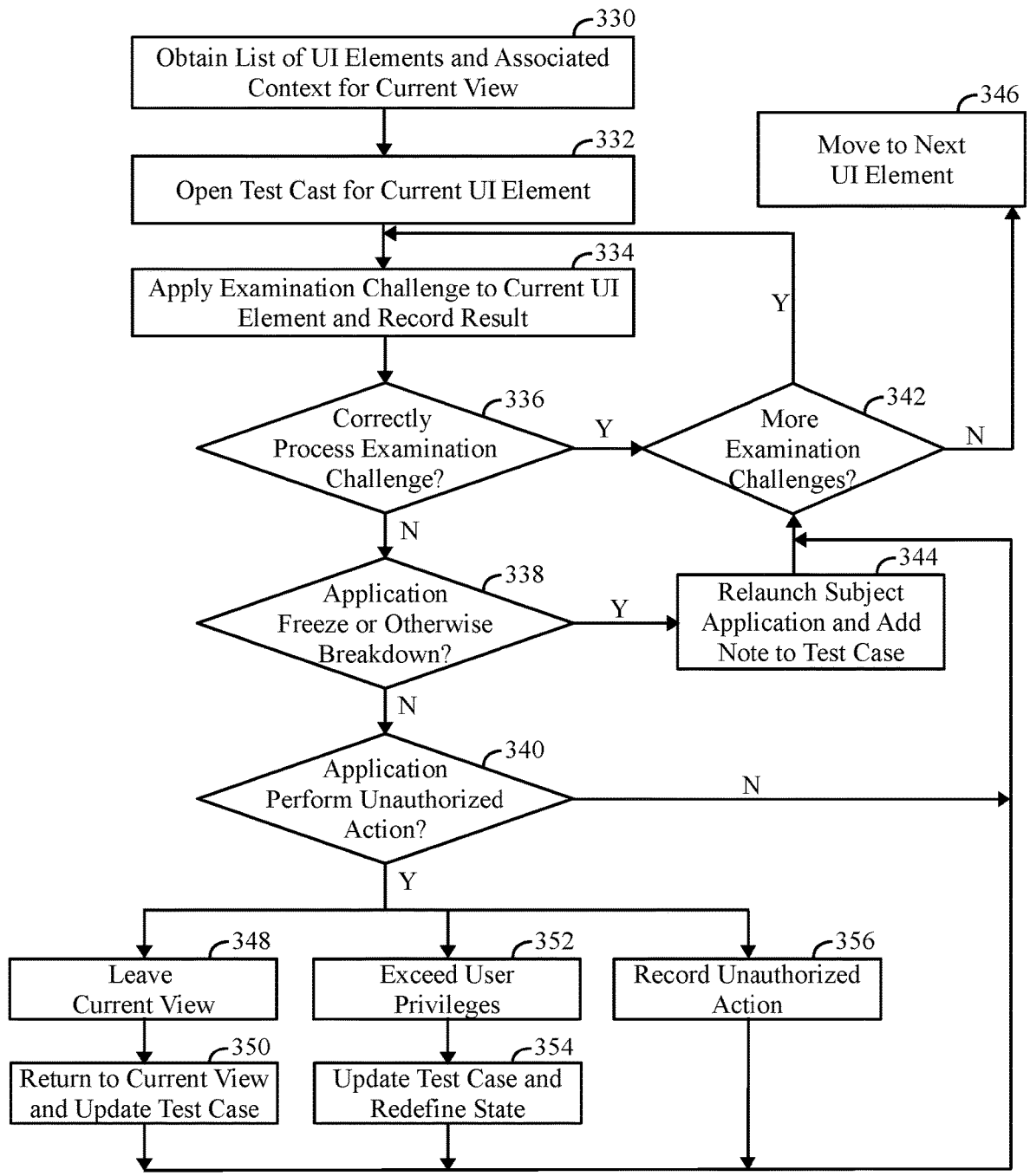
FIG. 3B illustrates a process for testing the UI elements of one or more views in accordance with embodiments herein.

FIG. 3B illustrates a process for testing the UI elements of one or more views in accordance with embodiments herein. At 330, the one or more processors obtain a list of UI elements and associated context for a current UI resource. At 332, the one or more processors open a test case for a current UI element.

At 334, the one or more processors apply an examination challenge to the UI element and records the results. At 336 to 340, the one or more processors analyze the results of the examination challenge. In particular, at 336, the one or more processors determine whether the subject application correctly processed the examination challenge. For example, the processors may determine whether the subject application safely and securely handled or otherwise acted upon the examination challenge. When an examination challenge is correctly handled at 336, flow advances to 342. Otherwise, flow continues to 338. At 342, the one or more processors determine whether additional examination challenges exist to be applied to the current UI element. When one or more additional examination challenges are available, flow advances from 342 back to 334. Alternatively, when no more examination challenges are to be applied to the current UI element, flow moves from 342 to 346. At 346, the one or more processors move to the next UI element on the list associated with the current UI resource.

At 338, the one or more processors determine whether the subject application freezes or terminates operation, in response to the examination challenge. When the subject application freezes or terminates, flow moves from 338 to 344. At 344, the one or more processors relaunch the subject application and add a note or other information to the test case indicating the nature of the freeze or breakdown. When the application is relaunched at 344, the one or more processors advance the subject application to the current UI resource that was being examined at the time of the breakdown. Next, flow moves to 342, where the one or more processors determine whether additional examination challenges exist to be applied to the current UI element. Alternatively, when the application does not freeze or breakdown, flow moves from 338 to 340.

At 340, the one or more processors determine whether the application has performed an unauthorized action in response to the examination challenge. When an unauthorized action occurs, flow moves from 340 and branches along various paths depending on the nature of the unauthorized action. When the application leaves a current UI resource in an unauthorized manner (348), the one or more processors return to the correct current UI resource and update the test case with information describing the unauthorized transition from the current UI resource. Thereafter, flow returns to 342 where the processors determine whether additional examination challenges are to be applied to the current UI element. In the event that the examination challenge causes the subject application to move to a different view/page, the operation at 350 returns to the correct bill payment view/page, in order to apply additional examination challenges. Additionally or alternatively, at 350, the process may convey results of applying the examination challenge, such as by storing the results in memory and/or displaying the results on a display of the device.

Additionally or alternatively, an unauthorized action may correspond to an action that has exceeded the privileges (352) associated with the user. At 354, the one or more processors update the test case to describe the nature of the user privileges that have been exceeded and potential resulting consequences. Additionally or alternatively, at 354, user privileges may be reset. Additionally or alternatively, at 354, the process may convey results of applying the examination challenges, such as by storing the results in memory and/or displaying the results on a display of the device. Thereafter, flow returns to 342 where the processors determine whether additional examination challenges are to be applied to the current UI element.

Additionally or alternatively, an unauthorized action may not result in a transition from a current UI resource, and may not exceed user privileges, but may still violate other rules within the subject application. Accordingly, at 356, the one or more processors convey results of applying the examination challenges to one or more of the memory or a display. For example the one or more processors record the unauthorized action. Thereafter, flow returns to 342 where the processors determine whether additional examination challenges are to be applied to the current UI element.

The operations of FIG. 3B are iteratively repeated until a desired number of examination challenges are applied to all or at least a select portion of the UI elements on the current UI resource. A test case is built in connection with each UI element indicating the types of examination challenges applied and the corresponding results. When an examination challenge results in a vulnerability, the examination challenge is recorded in the test case, along with a description of the vulnerability. Additionally or alternatively, when solutions or fixes are known for particular vulnerabilities, the test case may be updated to include a suggested fix/solution. Thereafter, the process may terminate and/or step to a next view/page to be examined.

In accordance with the foregoing, methods and systems are described that provide vulnerability testing for software applications. In accordance with embodiments herein, a security testing application is provided that simulates or mimics user behavior in a dynamic environment. The vulnerability testing application builds test cases by walking through functionality of the subject application.

CLOSING STATEMENTS

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
under control of one or more processors configured with executable instructions;
launching a subject application in the environment and automatically implementing functionality of user interactive (UI) resources defined by the subject application;
identifying a UI element provided on a first UI resource from the UI resources;
identifying a context indicator associated with the UI element;
generating one or more examination challenges for the UI element based on the context indicator; and
testing for vulnerabilities related to the UI element by applying the examination challenges to the UI elements.

2. The method of claim 1, wherein the UI resource represents a view, and wherein the identifying the context indicator comprises identifying descriptive information presented on the view in connection with the UI element, the descriptive information one or more of i) describing a purpose of the UI element or ii) providing instructions regarding how to use the UI element.

3. The method of claim 1, wherein the testing comprises determining whether the subject application freezes or terminates, in response to the examination challenge, and based thereon, re-launches the subject application.

4. The method of claim 3, further comprising returning the subject application to the first UI resource and context indicator present when the subject application froze or terminated.

5. The method of claim 1, further comprising determining whether the subject application has performed an unauthorized action in response to the examination challenge.

6. The method of claim 5, wherein the determining comprises determining whether the unauthorized action corresponds to an unauthorized transition from the first UI resource to a different unauthorized UI resource and in response thereto, returning to the first UI resource.

7. The method of claim 5, wherein the determining comprises determining whether the unauthorized action corresponds to an action that exceeds privileges associated with a user and in response thereto, returning the first UI resource to a UI resource state at which the privileges are not exceeded.

8. The method of claim 1, further comprising recording results of applying the examination challenges, wherein the UI element is identified by parsing a software structure of the subject application.

9. The method of claim 1, wherein the generating the one or more examination challenges comprises monitoring communication between the subject application and an external source, identifying a response object transmitted from the external source, and modifying the response object.

10. A system, comprising:
a processor;
memory to store program instructions accessible by the processor;
wherein, responsive to execution of the program instructions, the processor:
launches a subject application and automatically implements functionality of user interactive (UI) resources defined by the subject application;
identifies a UI element provided on a first UI resource from the UI resources;
identifies a context indicator associated with the UI element;
generates one or more examination challenges for the UI element based on the context indicator; and
tests for vulnerabilities related to the UI element by applying the examination challenges to the UI element.

11. The method of claim 1, further comprising analyzing the subject application to determine an environment in which the subject application operates; wherein launching further comprises launching the subject application in the environment.

12. The method of claim 11, wherein the environment is one of an X86 environment, an Advanced RISC Machine (ARM) environment, or a Microprocessor without Interlocked Pipeline Stages (MIPS) environment.

13. The system of claim 10, wherein the first UI resource includes first and second UI elements and wherein the processor, responsive to execution of the program instructions, automatically enters data in the first UI element and selects the second UI element to automatically implement the functionality to advance the first UI resource to a select resource state.

14. The system of claim 10, wherein the first UI resource represents a view, and wherein the processor, responsive to execution of the program instructions, identifies the context indicator by identifying descriptive information presented on the view in connection with the UI element, the descriptive information one or more of i) describing a purpose of the UI element or ii) providing instructions regarding how to use the UI element.

15. The system of claim 10, wherein the subject application comprises an XML, structure, and wherein the processor, responsive to execution of the program instructions, identifies the context indicator based on information in the XML structure.

16. The system of claim 10, wherein the processor, responsive to execution of the program instructions, determines whether the subject application has performed an unauthorized action in response to the examination challenge; and conveys results of applying the examination challenges to one or more of the memory or a display.

17. The system of claim 16, wherein the processor, responsive to execution of the program instructions, determines whether the unauthorized action corresponds to an unauthorized transition from the UI resource to a different unauthorized UI resource and in response thereto, returns to the UI resource.

18. The system of claim 16, wherein the processor, responsive to execution of the program instructions, determines whether the unauthorized action corresponds to an action that exceeds privileges associated with a user and in response thereto, returns the first UI resource to a UI resource state at which the privileges are not exceeded.

19. The system of claim 10, wherein the processor, responsive to execution of the program instructions, analyzes the subject application to determine an environment in which the subject application operates and launches the subject application in the environment.

20. The system of claim 19, wherein the environment is one of an X86 environment, an Advanced RISC Machine (ARM) environment, or a Microprocessor without Interlocked Pipeline Stages (MIPS) environment.

21. A computer program product comprising a non-signal computer readable storage medium comprising computer executable code for:
analyzing a subject application to determine an environment in which the subject application operates;
launching the subject application in the environment and automatically implementing functionality of user interactive (UI) resources defined by the subject application;
identifying a UI element provided on a first UI resource;
identifying a context indicator associated with the UI element;
generating one or more examination challenges for the UI element based on the context indicator;
testing for vulnerabilities related to the UI element by applying the examination challenges to the UI elements; and
conveying results of applying the examination challenges to one or more of memory or a display.

22. The computer program product of claim 21, further comprising code to define the first UI resource to include first and second UI elements and to automatically enter data in the first UI element and select the second UI element to automatically implement the functionality to advance the first UI resource to a select resource state.

23. The computer program product of claim 21, further comprising code to determine whether the subject application has performed an unauthorized action in response to the examination challenge, and determine whether the unauthorized action corresponds to an unauthorized transition from the first UI resource to a different unauthorized UI resource and in response thereto, returning to the first UI resource.

24. The computer program product of claim 21, further comprising code to:
determine whether the subject application has performed an unauthorized action in response to the examination challenge;
determine whether the unauthorized action corresponds to an action that exceeds privileges associated with a user; and
in response thereto, return the first UI resource to a UI resource state at which the privileges are not exceeded.

* * * * *